UNITED STATES PATENT OFFICE 2,634,203

HERBICIDAL COMPOSITION

David T. Mowry and Arthur H. Schlesinger, Dayton, Ohio, assignors to Monsanto Chemical Company, St. Louis, Mo., a corporation of Delaware No Drawing. Application December 17, 1951, Serial No. 262,158

6 Claims. (Cl. 71—2.7)

The present invention provides new and highly valuable herbicidal compositions and methods of destroying or preventing plant growth in which such compositions are employed.

We have found that improved, very efficient herbicidal compositions are obtained when there are prepared oil-in-water emulsions of cyano ether esters having the formula

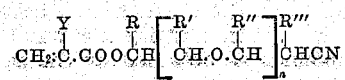

in which Y, R, R', R'' and R''' are selected from the class consisting of hydrogen and the methyl radical and $n$ is an integer of from 1 to 3.

Compounds having the above formula form the subject of the copending application of David T. Mowry and Eugene L. Ringwald, Serial No. 262,157, filed of even date. They are obtainable by contacting, in the presence of an esterifying agent, acrylic acid or an acid halide thereof such as acrylyl chloride or methacrylyl bromide with a hydroxy alkoxy nitrile having the formula

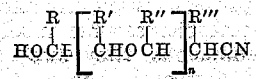

in which R, R', R'' and R''' are as defined above. Hydroxy alkoxy nitriles having this formula are easily obtainable by the addition of acrylonitrile or methacrylonitrile to alkylene glycols or to polyalkylene glycols having the formula

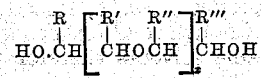

in which $x$ is 0, 1 or 2. As examples of useful hydroxyalkoxynitriles may be mentioned the 2-(2-hydroxyethoxy)propionitrile obtainable from ethylene glycol and acrylonitrile; the 2-(2-hydroxyethoxy)-1-methylpropionitrile obtainable from ethylene glycol and methacrylonitrile; the 2-(2-hydroxypropoxy)propionitrile obtainable from propylene-1,2-glycol and acrylonitrile; the 2-(2-hydroxy-1-methylpropoxy-propionitrile obtainable from 2,3-butylene glycol and acrylonitrile; the 2-[2-(2-hydroxyethoxy)ethoxy]propionitrile obtainable by reaction of diethylene glycol and acrylonitrile; and the hydroxy polyalkoxyalkylene nitriles obtainable by reaction of such polyglycols as triethylene glycol or tripropylene glycol with acrylonitrile or methacrylonitrile.

Examples of cyano-ether-esters which may be copolymerized with vinyl chloride to yield the present synthetic rubbers are: 2-(2-cyanoethoxy)ethyl acrylate or methacrylate which is obtainable from acrylic acid or methacrylic acid and 2-(2-hydroxyethoxy)propionitrile; 2-(2-cyanopropoxy)ethyl acrylate or methacrylate which is obtainable from acrylic acid or methacrylic acid and 2-(2-hydroxyethoxy)-1-methylpropionitrile; 2-[2-(2-cyanoethoxy)ethoxy]ethyl acrylate or methacrylate which is obtainable from acrylic acid or methacrylic acid and 2-[2-(2-hydroxyethoxy)ethoxy]propionitrile; 2-(2-cyanoethoxy)-1-methylethyl acrylate or methacrylate which is obtainable from acrylic or methacrylic acid and 2-(2-hydroxypropoxy)propionitrile, etc.

Herbicidally active emulsions of the present cyano ether esters may be obtained by first dissolving the esters in an organic material which is a solvent therefor and then mixing the organic solution with water in the presence of an emulsifying agent. Because of the high toxicity of the present cyano ether esters against living plants and the efficiency with which organic solutions of the same may be dispersed in an aqueous vehicle, extremely good herbicidal properties are evidenced by having only very small concentrations of the ester, for example, concentrations of from 0.1 per cent to 2 per cent by weight of the total weight of the emulsion.

Emulsifying agents which may be employed are those customarily used in the art for the preparation of oil-in-water emulsions, e. g., ionic or non-ionic emulsifying or dispersing agents such as the long-chain alkylbenzenesulfonates or polyglycol ethers. The emulsifying agents are likewise employed in only very small concentrations, say, in a quantity of from 0.05 to 1.0 per cent by weight of the total weight of the emulsion, and hence do not affect the chemical stability of the acrylate.

The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surfaces is sufficient to prevent plant growth in areas which are to be kept clear of plants. However the emulsions may be incorporated into customarily employed temporary surfacing materials, e. g., oils, cinders, etc.

The present invention is further illustrated, but not limited by the following examples:

Example 1

Spray testing of the present herbicidal composition was conducted as follows:

Cyclohexanone solutions of 2-(2-cyanoethoxy)-ethyl acrylate and of 2-(2-cyanopropoxy)ethyl acrylate were prepared. The respective solutions and an emulsifying agent were added to water, the quantity of solution employed being calculated to give emulsions containing 1.0 per cent and 0.3 per cent by weight, respectively, of each of the acrylates based on the total weight of each emulsion. The quantity of emulsifying agent used was 0.2 per cent by weight, based on the weight of each emulsion. Said emulsifying agent comprised a mixture of a polyalkyleneglycol derivative and an alkylbenzenesulfonate.

Three-week old corn and bean plants were sprayed with the respective emulsions, two plants of each variety being employed. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made.

| Percent Concentration of Acrylate | Effect On— | |
|---|---|---|
| | Bean | Corn |
| 2-(2-cyanoethoxy)ethyl acrylate: | | |
| 0.3% | Moderate injury | Slight injury. |
| 1.0% | Plant dead, leaves dried. | Severe injury, leaves dried. |
| 2-(2-cyanopropoxy)ethyl acrylate: | | |
| 0.3% | Moderate injury | Moderate injury. |
| 1.0% | Severe injury, leaves dried and dropped. | Severe injury. |

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of cucumber, beet, radish and rye grass seeds, respectively, were prepared. The surface soil of the seeded boxes was then sprayed, respectively, with the 0.3 per cent and 1.0 per cent emulsions of 2-(2-cyanoethoxy)ethyl acrylate described in Example 1. The quantity of each emulsion which was applied was calculated to correspond to either 20 lbs. of the 2-(2-cyanoethoxy)ethyl acrylate per acre or to 50 lbs. per acre. In the present instance 10.8 cc. of the 0.3 per cent emulsion per 25 square inches of surface soil was calculated to correspond to 20 lbs. of the chemical per acre and 9.1 cc. of the 1.0 per cent emulsion to 50 lbs. of the chemical per acre. The sprayed boxes as well as similar seeded but unsprayed test boxes were then maintained at standard conditions of temperature and watering for a period of two weeks. At the end of that time the number of healthy seedlings in each box was counted. Thus the number of non-emerging and damaged seedlings was obtained by difference. This difference is designated as "X." "Per cent phytotoxicity" of the herbicidal composition was determined by the ratio of "X" to the number of healthy seedlings.

There was evidenced from 71 per cent to 100 per cent phytotoxicity to all four of the tested varieties at the 50 lbs./acre rate of application and a phytotoxicity of from 46 to 70 per cent to radish and rye grass at the 20 lbs./acre rate. The phytotoxicity to cucumber and beets at the 20 lbs./acre rate was less marked.

Example 3

The herbicidal activity of 2-(2-cyanoethoxy)-ethyl acrylate was determined by germination of cucumber seeds, for 4 days at a temperature of 76° F. in the presence of an aqueous emulsion of the acrylate at a concentration of 100 p. p. m. Fifty seeds were used for each of two duplicate tests. The results were expressed as per cent length of the primary roots in the presence of the chemical as compared with the length of the primary roots of controls which had been germinated in water. The activity of a number of related compounds as obtained by the same testing procedure are included for comparison.

The following results were obtained.

| Compound Tested | Percent Growth at 100 p. p. m. |
|---|---|
| 2-(2-Cyanoethoxy)ethyl acrylate | 10 |
| 2-Methoxyethyl acrylate | 87 |
| Methyl acrylate | 100 |
| 2-Cyanoethyl methallyl ether | 87 |
| 2-Cyanoethyl cinnamate | 64 |
| Bis-2-(2-cyanoethoxy)ethyl phthalate | 86 |
| 2-Cyanoethoxyethanol | 89 |

While the present esters are most advantageously used as herbicides when incorporated into oil-in-water emulsions, they may also be used in other plant destroying methods. Thus they may be mixed with solid carriers such as clay, talc, pumice and bentonite to give herbicidal compositions which may be applied in toxic quantities to undesired plant growth. The present esters may also be mixed with liquid or solid agricultural pesticides, e. g., insecticides and/or fungicides. Although solutions of the cyano ether esters in organic solvents therefor may be employed as herbicidal compositions, we have found that the oil-in-water emulsions of the present acrylates possess an improved tendency to adhere to plant foliage, and that the emulsions require less of the esters to give comparable herbicidal efficiency than do the organic solutions or the dry mixtures.

What we claim is:

1. A herbicidal composition comprising an oil-in-water emulsion of a cyano ethyl ester having the formula

in which Y, R, R', R'' and R''' are selected from the class consisting of hydrogen and the methyl radical and $n$ is an integer of from 1 to 3, said cyano ethyl ester being present in said emulsion in a quantity which is toxic to plant growth.

2. A herbicidal composition comprising an oil-in-water emulsion of 2-(2-cyanoethoxy)ethyl acrylate, said acrylate being present in said emulsion in a quantity which is toxic to plant growth.

3. A herbicidal composition comprising an oil-in-water emulsion of 2-(2-cyanopropoxy)ethyl acrylate, said acrylate being present in said emulsion in a quantity which is toxic to plant growth.

4. The method of destroying undesirable plants which comprises applying to said plants a toxic quantity of a herbicidal composition comprising an oil-in-water emulsion of a cyano ether ester having the formula

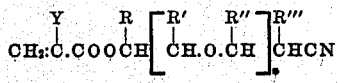

in which Y, R, R', R'' and R''' are selected from the class consisting of hydrogen and the methyl radical and $n$ is an integer of from 1 to 3.

5. The method of destroying undesirable plant growth which comprises applying to said plants a toxic quantity of a herbicidal composition comprising an oil-in-water emulsion of 2-(2-cyanoethoxy)ethyl acrylate.

6. The method of destroying undesirable plant growth which comprises applying to said plants a toxic quantity of a herbicidal composition comprising an oil-in-water emulsion of 2-(2-cyanopropoxy)ethyl acrylate.

DAVID T. MOWRY.
ARTHUR H. SCHLESINGER.

No references cited.